(No Model.) 2 Sheets—Sheet 1.

P. M. LEPROHON.
FISHING REEL.

No. 488,678. Patented Dec. 27, 1892.

WITNESSES:
Marion Hall
William Diehm

INVENTOR
P. M. Leprohon
BY Goepel & Raegener
ATTORNEYS.

(No Model.) 2 Sheets—Sheet 2.

P. M. LEPROHON.
FISHING REEL.

No. 488,678. Patented Dec. 27, 1892.

WITNESSES:
Marion Hall
William Diehm

INVENTOR
P. M. Leprohon.
BY Guypel & Ruegener
ATTORNEYS.

UNITED STATES PATENT OFFICE.

PANTALÉON M. LEPROHON, OF BROOKLYN, NEW YORK.

FISHING-REEL.

SPECIFICATION forming part of Letters Patent No. 488,678, dated December 27, 1892.

Application filed April 5, 1892. Serial No. 427,873. (No model.)

*To all whom it may concern:*

Be it known that I, PANTALÉON M. LEPROHON, a citizen of the United States, residing at Brooklyn, in the county of Kings, in the State of New York, have invented certain new and useful Improvements in Reels for Deep-Sea Fishing, of which the following is a specification.

This invention relates to improvements in reels for deep sea fishing.

The object of my invention is to provide a reel from which the line can be unwound very rapidly and with the least possible amount of friction, which line can also be rapidly wound upon the reel and the reel and its pole manipulated in such a manner as to land the fish in the most perfect manner and with the least amount of trouble to the fisherman.

The invention consists in the combination with a frame formed of united standards, of a reel or drum mounted in the same, a cog-wheel on the drum, a pivoted movable frame on one of the standards, a cog-wheel on said frame, a crank for turning the cog-wheel on the frame, and means for raising or lowering said frame to engage or disengage the cog-wheels.

The invention further consists in the combination with a base-plate, of a frame pivoted on the same, a reel on said frame and means for holding a pole on the frame.

The invention also consists in the construction and combination of parts and details which will be fully described hereinafter and finally pointed out in the claims.

Figure 1:
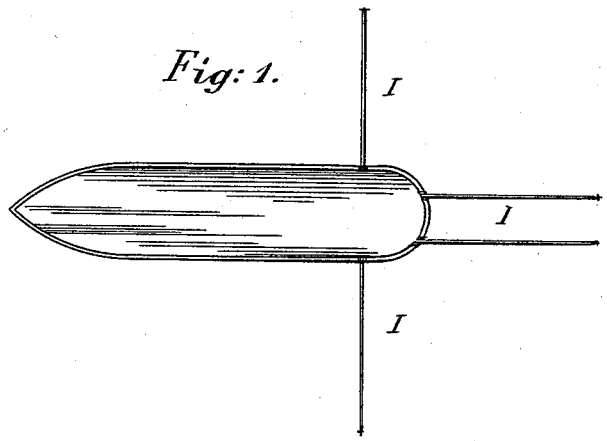
Figure 2:
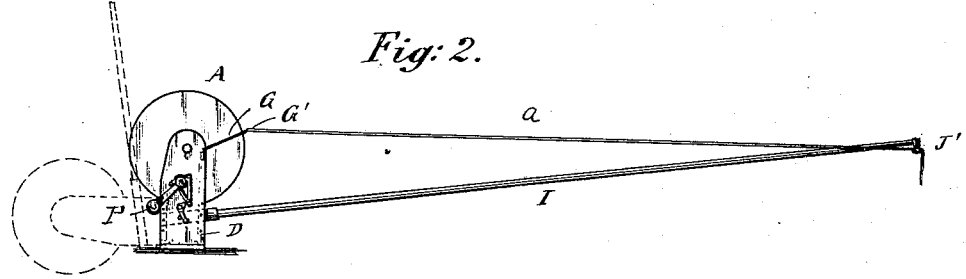
Figure 4:
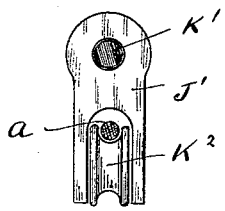
Figure 3:
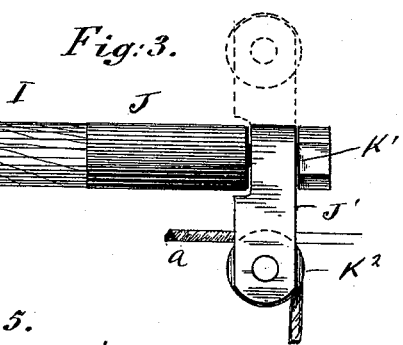
Figure 5:
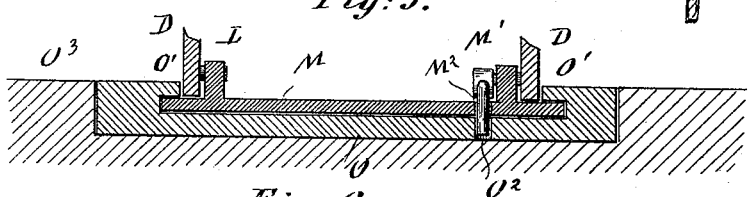
Figure 6:
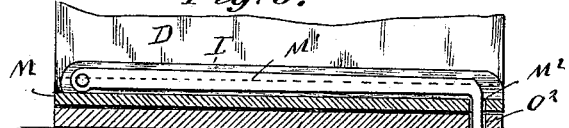
Figure 7:
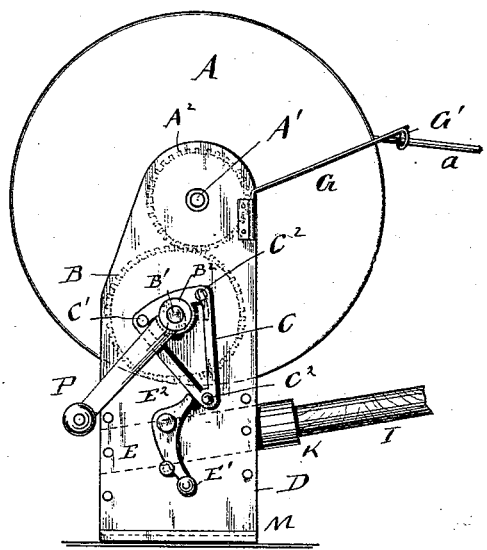
Figure 8:
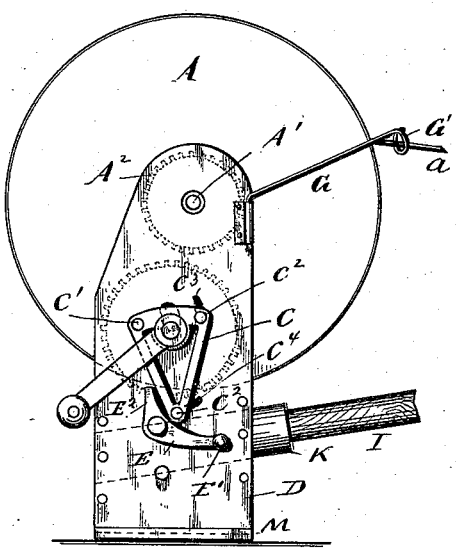
Figure 10:
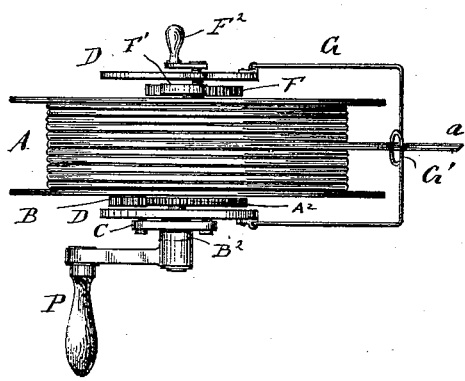
Figure 9:
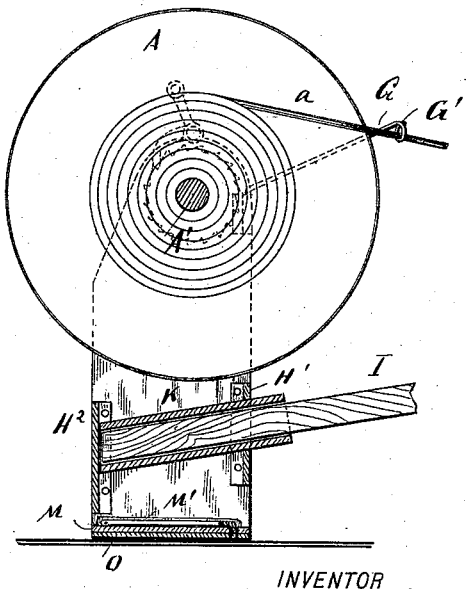

In the accompanying drawings, Figure 1 is a plan-view of a vessel provided with my improved reels and outriggers: Fig. 2 is a side-view of the reel and outrigger or pole: Fig. 3 is an enlarged side-view of the swivel on the end of the pole or outrigger: Fig. 4 is a sectional view on the line 4 4, of Fig. 3. Fig. 5 is a longitudinal-sectional view of the supporting plate in the gunwale of the boat: Fig. 6 is a transverse-sectional view of the same on line 6 6, of Fig. 5. Figs. 7 and 8 are side-views of the reel and supports, showing the gearing in different positions: Fig. 9 is a longitudinal vertical-sectional view of the reel and support, and Fig. 10 is a plan-view of the same.

Similar letters of reference indicate corresponding parts.

The reel A or drum, which may be of any approved construction or made of any desired material, is fixed on the shaft $A'$ provided with a cog-wheel $A^2$, which cog-wheel engages a cog-wheel B, fixed on the shaft $B'$, that is mounted to turn in a sleeve $B^2$ projecting from the top-part of a frame C, that is pivoted at $C'$ to a standard D. The frame is arranged at the outer side of the standard, and the cog-wheels $A^2$ and B at the inner side, between said inner side of the standard and the outer side of the reel or drum A. The frame C is provided with pins $C^2$, which are guided in slots $C^3$ and $C^4$ of the standard D, so as to insure the proper movement of the frame C. A lever E, provided with a handle $E'$ at one end and a cam-part $E^2$ at the other end, is pivoted on the outer surface of the standard D, and its cam-end is adapted to act on the frame C. When the lever E is in position, shown in Fig. 7, it holds the frame C in raised position and keeps the cog-wheels $A^2$ and B engaged. When the cam-lever E is swung in the position shown in Fig. 8, it permits the frame C to swing down, whereby the cog-wheels $A^2$ and B are disengaged and the drum A is absolutely free to revolve.

The shaft $A'$ is provided with a ratchet-wheel F on the side opposite the one carrying the cog-wheel $A^2$, and said ratchet-wheel is engaged by a pawl $F'$ pivoted on the top of the standard D and provided with a suitable handle $F^2$ for shifting or adjusting it. The U-shaped arm G is suitably attached to the two standards D and on its cross-piece an eye $G'$ is formed for guiding the line $a$ that passes from the reel. The standards D D are securely united by two plates $H'$ $H^2$ fastened to said standards at the edges and in said plates a socket-tube K is held, which socket-tube serves to receive the butt-end of the pole or outrigger I, which may be of greater or less length and made of any suitable material. The outer end of said outrigger is provided with a ferrule J, to one end of which an arm $J'$ is swiveled by a pin $K'$, the free end of said arm $J'$ being forked and carrying a grooved roller or pulley $K^2$, over which the line is passed. This swiveled arm on the end of the outrigger or pole prevents the line from being entangled or twisted by the different movements of the vessel, for example as in tacking, and at all times guides the line properly to the edge G'. The two standards D are pivoted at their lower inner corners to lugs or flanges L projecting upward from a base-plate M, and to one of said lugs or standards a latch M' is pivoted, the prong of which is adapted to pass through the slot M² in said base-plate. A plate O provided with the undercut flanges O', is set into the gunwale O³ of the ship, in such a manner, as shown in Fig. 5, and is securely fastened thereto. This plate O is provided with a transverse opening of the width of the base-plate M, so that said base-plate can slide transversely into said opening, the side-edges of the base-plate passing below the undercut flanges O' of the plate O. The prong of the latch M', after passing through the slot M² in the base-plate M, passes into an opening O² of the plate O, and thereby locking the base-plate M securely to the plate O.

When it is desired to remove the reel, all that is necessary is to disengage the base-plate M and the plate O and to slide the plate M out of the said plate O. The opening in the plate O can then be filled by a suitable filling-plate provided for that purpose. The reel can thus be easily detached or removed, as circumstances may require.

The reel is used in the following manner:—
After the line has been baited, the pawl F' is disengaged from the ratchet-wheel F, and the lever E is thrown into the position shown in Fig. 8, so as to permit the frame C to descend and the cog-wheels A² and B to disengage. The line can be cast or dropped, unwinding rapidly from the reel or drum, which is now entirely free to revolve. The fisherman then places his hand upon the line between the roller on the end of the outrigger or pole I and the eye G', and can tell by the strain on the line whether he has a bite or not. After a fish has taken the bait, the fisherman first brings the lever E from the position shown in Fig. 8 to the position shown in Fig. 7, so as to raise the frame C and engage the cog-wheels A² and B and then throws the pawl F' in gear with the ratchet-wheel F and turns the crank-handle P secured to the end of the shaft B'. Thereby the reel is turned and the line wound on it, the pawl F' preventing the unwinding of the same from the reel. When the fish on the hook at the end of the line has about reached the end of the pole or outrigger, the reel-supporting frame is tilted on its pivots, as shown in dotted lines in Fig. 2, whereby the pole or outrigger is thrown in upward position and the fish brought high above the deck and over the same, the pawl is disengaged and the lever E moves in the position shown in Fig. 7, so as to permit the cog-wheel A² and B to disengage, whereupon the fish drops to the deck as the reel is free and the line can wind freely. After the fish has been removed from the hook, the parts are again adjusted into the original position and the second cast made.

The improved reel is especially adapted for trolling for all kinds of fish and also for still fishing.

Having thus described my invention, I claim as new and desire to secure by Letters Patent:—

1. The combination, with a base-plate, of two standards pivoted on the base-plate so as to swing on the same, plates uniting said standards, a reel mounted in said swinging standards, means for turning the reel and a pole-socket for receiving the end of a pole, held in said standards, substantially as set forth.

2. The combination, with a base-plate, of a socket-plate into which the base-plate can slide, a latch for locking the base-plate to the socket-plate, a frame pivoted to the base-plate, a reel mounted in said frame and a socket for receiving the end of the pole on said frame, substantially as set forth.

In testimony that I claim the foregoing as my invention I have signed my name in presence of two subscribing witnesses

PANTALÉON M. LEPROHON.

Witnesses:
OSCAR F. GUNZ,
CHARLES SCHROEDER.